July 28, 1953 — O. SUTTLES — 2,646,787
HOT-AIR CIRCULATING ATTACHMENT FOR COOK STOVES
Filed March 17, 1950 — 2 Sheets-Sheet 1

INVENTOR.
OMAR SUTTLES
BY
HIS ATTORNEY

July 28, 1953 O. SUTTLES 2,646,787
HOT-AIR CIRCULATING ATTACHMENT FOR COOK STOVES
Filed March 17, 1950 2 Sheets-Sheet 2

INVENTOR:
OMAR SUTTLES
BY
HIS ATTORNEY

Patented July 28, 1953

2,646,787

UNITED STATES PATENT OFFICE 2,646,787

HOT-AIR CIRCULATING ATTACHMENT FOR COOK STOVES

Omar Suttles, Los Angeles, Calif.

Application March 17, 1950, Serial No. 150,147

6 Claims. (Cl. 126—4)

1

This invention relates to heat distributing devices and has particular reference to a device of this character which may be placed within the oven of a kitchen range.

It is the object of the invention to provide a heat distributing device which, when placed within a heated oven will absorb the heat rising through the oven. It is a further object of the invention to provide a heat distributing device which, while capable of absorbing the heat rising through the oven, will exclude all fumes or gases of the combustion products rising through the oven from entering into the device.

These and other objects of the invention will be better understood from the following detailed description and by referring to the accompanying drawings in which a preferred form of the invention is illustrated.

Figure 1:
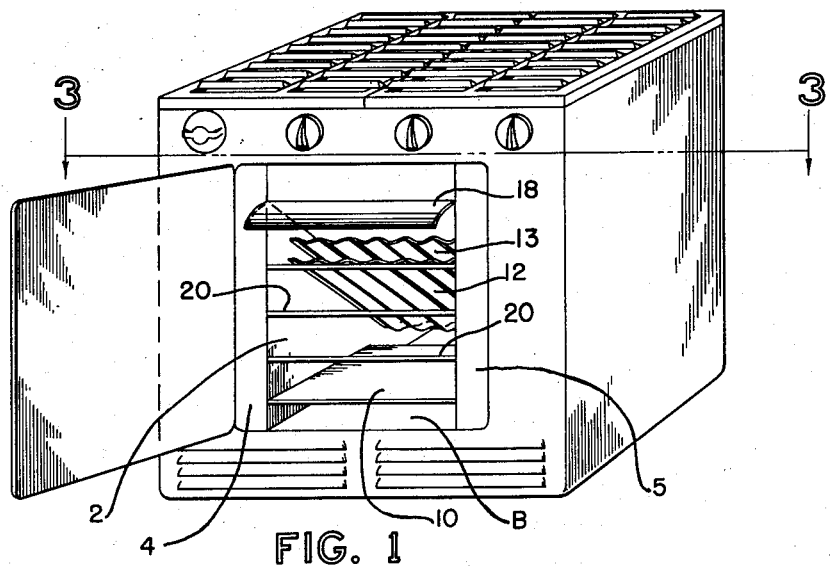
Fig. 1 is a front elevational view of a kitchen range into the opened oven of which the device of the invention is shown inserted.
Figure 2:
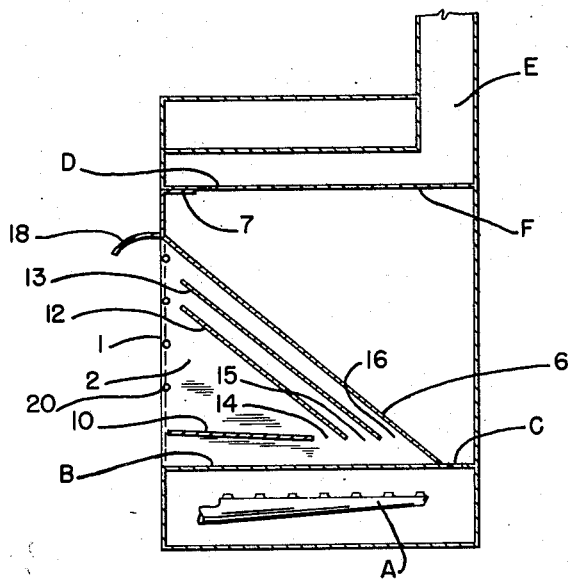
Fig. 2 is a sectional side elevational view substantially through the center of the range of Fig. 1.

The device of the invention, in the form illustrated in the drawings, consists of a hood-shaped frame 1 which may be inserted into the oven space of the well-known Coleman trailer cook stove.

The oven burner A of this stove is placed below the bottom plate B of the oven to spread the heat of the burning gases over the bottom of this plate and to carry the combustion products through a series of perforations C and up through the space within the oven to a discharge D at the top of the stove. A flue E is generally added to carry the fumes away from the space within the trailer and such flue should be used in order to obtain the best results.

The frame 1 includes sidewalls 2, 3, the front edges of which are bent at right angles to form flanges 4, 5 of a width to fit snugly within the front opening of the oven. A forwardly inclined rear wall 6 connects these side walls and it is at the top thereof bent upwardly and rearwardly to provide a flange 7 which comes to rest against the top plate F of the oven when the framing is

Figure 3:
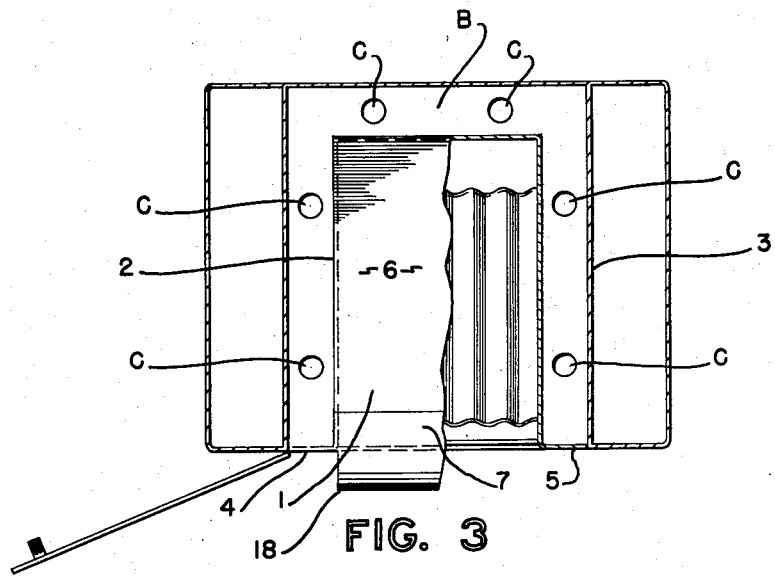
Fig. 3 is a sectional plan view taken substantially on line 3—3 of Fig. 1 and with a portion of the framing of the device of the invention broken away for the sake of clearness.
Figure 4:
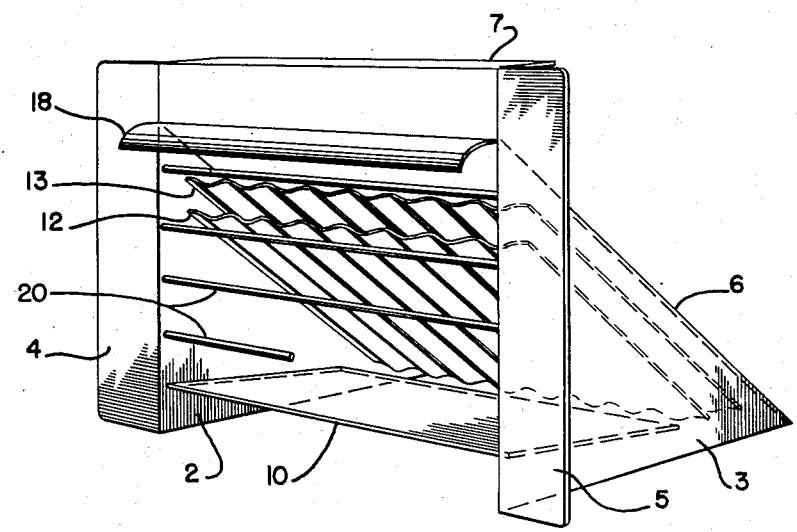
Fig. 4 is a perspective view of the device as it appears when removed from the oven of the range.

2 placed in position therein. When this frame is properly proportioned, it is found that it will fit tightly within the front opening of the oven and that, as best shown in Fig. 3, the side wall 2, 3 of the frame as well as the bottom portion of the rear wall 6 are spaced away from the side and rear walls of the oven a distance sufficient to uncover the passages C of the oven bottom plate B. The hot fumes rising through these passages will flow over the outer surfaces of the frame on their way to the discharge passage D, thereby intensely to heat the walls of the frame.

Within the frame, a short distance above the bottom plate B of the oven and parallel therewith, is placed a partition 10 which spans the entire distance between the side walls 2, 3 and extends about one half the distance into the space within the frame. In addition, I have shown two inclined baffle plates 12, 13 spanning the distance between the side walls 2, 3 and positioned in parallel relation to the rear wall 6 of the frame. The bottom edges of these baffles should be in continued horizontal alignment with the partition 10 and so placed relative to the inner edge of the partition and to the rear wall 6 that the widths of the spaces 14, 15, 16 therebetween are substantially the same.

When the parts are proportioned and relatively positioned in this manner, it is found that the cool air from the space within the trailer will flow through the space between the partition 10 and the heated bottom plate B of the oven, quickly to expand and to rise through the passages 14, 15, 16, thence to flow along the baffles 12, 13 and the heated rear wall 6 into the space within the trailer to be heated.

It is seen from the foregoing description that I have provided a very simple and inexpensive air circulating attachment for the oven of a cook stove. But while I have hereinbefore, for the sake of convenience of description, referred to the device as applicable to a particular type of cook stove it is to be understood that the device of my invention is adaptable for use in connection with other types of stoves or ranges in any place where such cooking apparatus may be found; and while I have found the proportions of the component parts of the device as well as the particular relations of the parts to each other most satisfactory, I reserve the right to embody therein such modifications as will fall within the scope of the claims hereto appended. I have, for example, found that, by using corrugated material in the making of the baffle plates 12, 13, a more even distribution of the heated air rising through the passages 14, 15, 16 is obtained. It may also be found advisable to extend from the top of the inclined rear plate 6 a deflector 18 of a shape to direct the flow of the heated air into the lower portion of the room to be heated. While the partition 10 will materially assist in maintaining the side walls of the frame in properly spaced relation to each other, it may be found advisable further to strengthen the front portion of the frame. To this end I have shown a series of rods 20 spanning the distance between the side walls 2, 3, and rigidly anchored therein.

I claim:

1. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, and means within the frame for directing the heat rising from the bottom plate of the oven rearwardly to and along the forwardly inclined inner surface of the frame rear wall.

2. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, a series of baffle plates within the frame parallel with the rear wall of the frame, and means within the frame for directing the heat rising from the bottom plate of the oven rearwardly to and along the forwardly inclined baffle plates and the inner surface of the frame rear wall.

3. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, a partition in the frame a distance above the bottom edge thereof and horizontally extending toward the rear wall of the frame and a series of baffle plates within the frame between the inner edge of said partition and the frame rear wall, said baffle plates rising parallel with said rear wall nearly to the front opening of the frame.

4. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, a series of longitudinally corrugated baffle plates within the frame parallel with the rear wall of the frame, and means within the frame for directing the heat rising from the bottom plate of the oven rearwardly to and along the forwardly inclined baffle plates and the inner surface of the frame rear wall.

5. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, a series of baffle plates within the frame parallel with and in uniformly spaced relation to the rear wall of the frame, and means within the frame for directing the heat rising from the bottom plate of the oven rearwardly to and along the forwardly inclined baffle plates and the inner surface of the frame rear wall.

6. An air circulating device mountable in the oven of a cook stove, the oven having a bottom plate and passages through said plate near the side walls and the rear wall thereof; said device taking the form of a hood-shaped frame seatable on the bottom plate of the oven within the passages thereof entirely to separate the space within the frame from the oven space without the frame, the frame including side walls and a forwardly inclined rear wall rising from the rear bottom corners of the side walls to the upper front corners thereof, flanges extending from the front edges of said walls to form a rim snugly fittable within the front opening of the oven, the rear wall extending forward below the top flange of the frame to form a downwardly directed deflector for the heated air rising through the frame, and means within the frame for directing the heat rising from the bottom plate of the oven rearwardly to and along the forwardly inclined inner surface of the frame rear wall.

OMAR SUTTLES.

References Cited in the file of this patent

UNITED STATES PATENTS

| Number | Name | Date |
|---|---|---|
| 1,771,693 | Schmitt | July 29, 1930 |
| 1,867,740 | Guy | July 19, 1932 |
| 2,083,145 | Campbell | June 8, 1937 |